United States Patent Office 3,010,971
Patented Nov. 28, 1961

3,010,971
CYCLOPROPYLAMINE DERIVATIVES AND PROCESSES FOR THEIR PREPARATION
Carl Kaiser, Haddon Heights, N.J., and Charles Leon Zirkle, Berwyn, Pa., assignors to Smith, Kline & French Laboratories, Philadelphia, Pa., a corporation of Pennsylvania
No Drawing. Filed Aug. 4, 1960, Ser. No. 47,372
11 Claims. (Cl. 260—319)

The invention relates to novel organic compounds demonstrating physiological activity and more specifically pertains to cyclopropylamine derivatives of fused benzo-heterocyclic ring systems.

The compounds of this invention exhibit an ability to alter or modify the actions of the central nervous system and in this respect are useful in the animal organism, particularly as anti-depressive, ataractic and hypotensive agents. Certain of our compounds demonstrate a particularly rapid onset of action and short duration of activity which render them as important therapeutic agents for certain psychological indications. In addition, compounds of this invention exhibit mono-amine oxidase inhibitory properties, presumably thus causing the observed anti-depressant activity. Our compounds may be administered orally, subcutaneously or intravenously in any of the known pharmaceutical forms generally employed for these routes.

In general, the compounds of our present invention may be represented by the following structural formula:

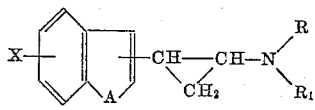

FIGURE I wherein X represents hydrogen, halogeno, lower alkyl, lower alkoxy, halogenated lower alkyl, nitro, amino or hydroxyl; A represents a member selected from the group consisting of —O—, —S—, and

R and $R_1$ represents hydrogen, lower alkyl, or taken together with the nitrogen atom to which they are attached, represent a heterocyclic ring containing 4–5 carbon atoms.

Also embraced within the scope of our invention are the pharmaceutically accepted acid addition salts of the aforedescribed amines.

The configuration about the cyclopropane ring lies in either the cis or trans form and both forms are embraced by our invention.

Exemplary of the group represented by the symbol X, are in addition to hydrogen, halogen, such as bromo, chloro, fluoro, iodo; lower alkyl of from 1 to 6 carbon atoms, preferably 1 to 2, such as methyl, ethyl, propyl, isopropyl, butyl and t-butyl; lower alkoxy of from 1 to 6 carbon atoms, preferably 1 to 2, such as methoxy, ethoxy, propoxy and the like; halogenated lower alkyl such as dichloroethyl and trifluoromethyl; nitro; hydroxy; and amino including primary, secondary and tertiary amino such as methylamino, ethylamino, dimethylamino, diethylamino and the like. The groups R and $R_1$ may be alike or different, thus embracing primary, secondary and tertiary alkylamines or the groups $R_1$ and $R_2$ taken with the nitrogen to which they are attached, can represent heterocyclic systems such as piperidinyl, pyrrolidinyl, piperazinyl and the like as well as substituted analogs of such heterocyclic systems such as for example, N-hydroxyethylpiperazinyl.

It can be seen from the above description that the compounds of our invention are benzofurans, thianaphthenes and indoles which are optionally substituted in the benzene nucleus and which are additionally substituted in the 2 or 3 position by an 2-aminocyclopropane moiety. In general, compounds of our invention are prepared from materials possessing the basic fused bicyclic structure shown above, which is additionally substituted in the 2 or 3 position by a cyclopropanecarboxylic acid substituent (II). This compound is converted to the corresponding acid chloride (III) by treatment with thionyl chloride. By subjecting this acid chloride to the action of sodium azide followed by thermal decomposition, there is formed the corresponding isocyanate (IV) which upon basic hydrolysis yields the desired amine (V). This amine may be further substituted according to the procedures known to and employed in the art for modifying amine groups. These reactions may be represented as follows:

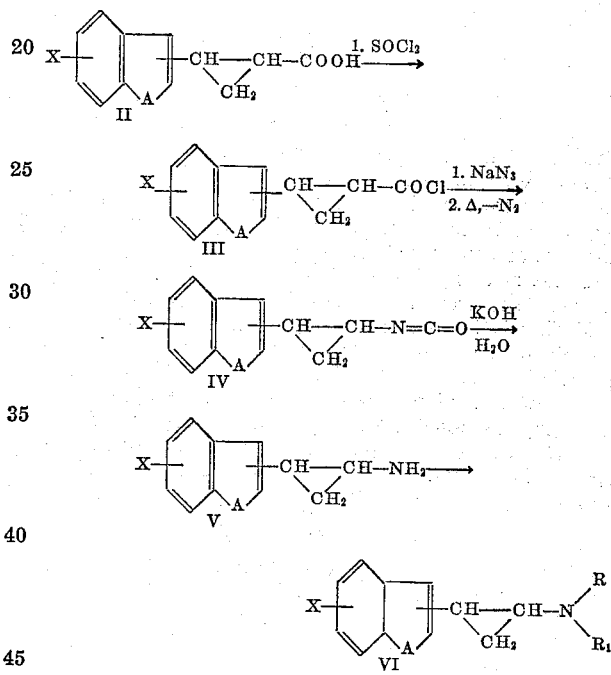

FIGURE II

The requisite starting materials having structure according to formula II are prepared from either a benzofuran, indole, and thianaphthene unsubstituted in the 2 or 3 position or from the corresponding compounds in which a side chain is present in the 2 or 3 position. In either case, the substituent represented by the symbol X is generally either present in the starting material or represented by a group convertible thereto.

Thus for example a thianaphthene containing the desired substituent in the benzo nucleus is treated with acetaldehyde in the presence of butyl lithium to yield the corresponding 1-(2-thianaphthenyl)-ethanol (VII, B=S). Acetylation of this secondary alcohol followed by pyrolysis yields the correspondingly substituted 2-vinylthianaphthene (VIII, B=S). Subsequent treatment of this vinyl compound with ethyl diazoacetate followed by heating, forms the ethyl 2-(2-thianaphthenyl)-cyclopropanecarboxylate (IX, B=S) which upon saponification yields the desired cyclopropanecarboxylic acid (X, B=S) embraced by Formula II.

Similarly a 1-(2-benzofuryl)-ethanol (VII, B=O) is converted to the corresponding vinyl compound (VIII, B=O) and upon diazotization and saponification, the desired 2-(2-benzofuryl)-cyclopropanecarboxylic acid (X, B=O) is obtained. These reactions may be represented as follows:

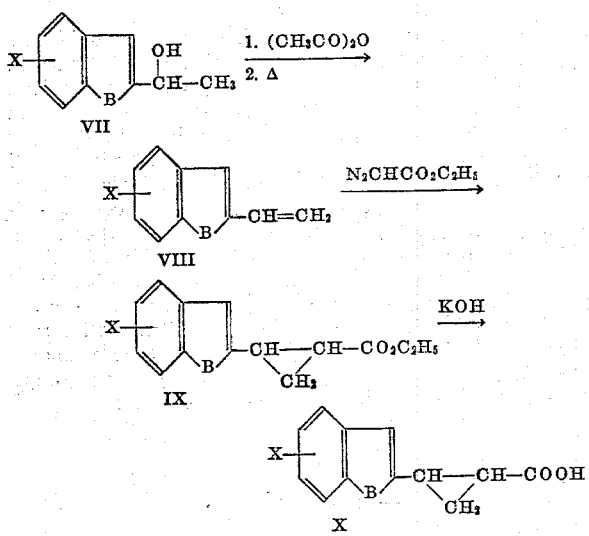

FIGURE III wherein B represents oxygen or sulfur.

The requisite 1-(2-benzofuryl)-ethanol may be obtained by condensation of a salicylaldehyde and chloroacetone under basic conditions followed reduction of the 2-acetylbenzofuran so formed.

In the case of the 2-substituted indoles we have found it possible to prepare the desired cyclopropanecarboxylic acid directly in three steps by condensing an appropriate phenyl hydrazine (XI) with ethyl 2-acetylcyclopropanecarboxylate and treating the resultant hydrazone (XII) with a mineral acid so as to effect cyclization. The ethyl 2-(2-indolyl)-cyclopropanecarboxylate (XIII) thus obtained is then saponified as above to form the desired acid (XIV). These reactions are represented as follows:

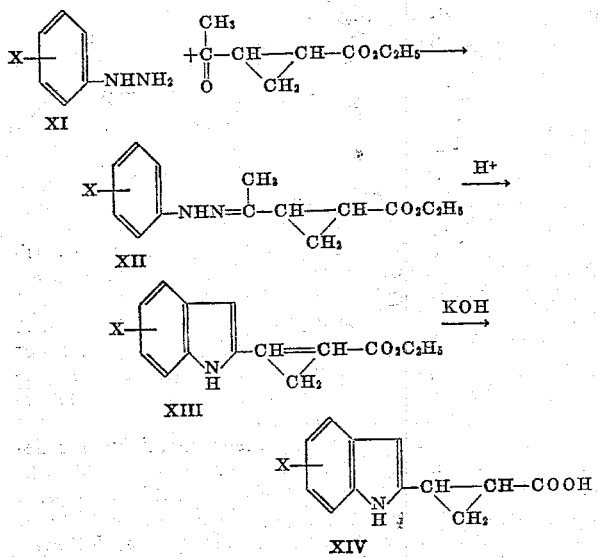

FIGURE IV

In those compounds of our invention wherein the cyclopropylamine moiety is in the 3-position, the requisite starting materials, as represented by Formula II, are thianaphthenes, indoles, and benzofurans in which a cyclopropane carboxylic acid group is present in this position. The procedures employed for preparing these requisite starting compounds are analogous to those employed for preparing the 2-substituted compounds. Thus for example, 2-(3-benzofuryl)-ethanol (prepared by the action of methyl magnesium iodide on a 3-cyanobenzofuran followed by sodium borohydride reduction of the resultant benzofurylmethyl ketone) is acetylated to form the corresponding ester, this ester then pyrolized, the resultant vinyl compound treated with ethyl diazoacetate, and the ethyl 2-(3-benzofuryl)-cyclopropane carboxylate thus formed saponified as heretofore described to yield the corresponding 2-(3-benzofuryl)-cyclopropanecarboxylic acid.

The 3-cyclopropanecarboxylic acid indoles are likewise prepared in a manner analogous to that employed for the preparation of the 2-substituted indoles, namely cyclization of an appropriate hydrazone (XV). In this instance, the requisite hydrazone is formed by the action of a phenyldiazonium chloride on ethyl-α-(2-carboethoxycyclopropylcarbinyl)-acetoacetate. Cyclization of this hydrazone in the manner heretofore described followed by saponification yields the corresponding indole (XVII), substituted in the 3-position by a cyclopropanecarboxylic acid function and further substituted in the 2-position by a carboxylic acid function. The carboxylic acid in the 2-position is readily removed by refluxing in dilute hydrochloric acid to yield the desired 2-(3-indolyl)-cyclopropanecarboxylic acid (XVIII). These reactions may be represented as follows:

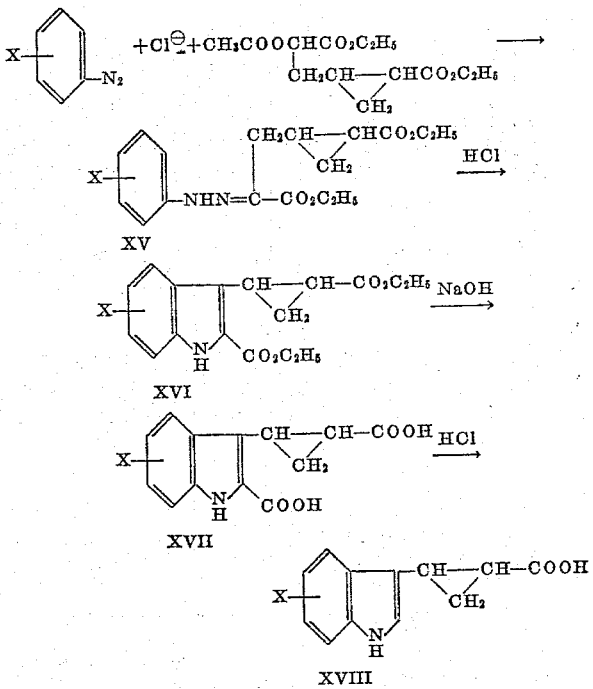

FIGURE V

The substituted thianaphthene-3-cyclopropanecarboxylic acid corresponding to Formula II, is prepared by treating the ethyl ester of the appropriate 3-chloro-3-(3-thianaphthenyl)-butyric acid (XXII) with potassium t-butoxide Under these conditions, cyclization of the three carbon chain occurs yielding ethyl 2-(3-thianaphthenyl)-cyclopropanecarboxylate (XXIII) which is readily saponified as heretofore described to yield the corresponding free acid (XXIV). The requisite substituted butyric ester is prepared as follows: The appropriately substituted thianaphthene is subjected to a Friedel-Crafts type reaction with succinic anhydride and the 3-oxo-3-(3-thianaphthenyl)-butyric acid (XIX) thus obtained then reduced by the action of sodium borohydride to yield the 3-hydroxy-3-(3-thianaphthenyl)-butyric acid (XX). Upon heating, this substituted hydroxybutyric acid converted into its lactone (XXI) and upon treatment of this lactone with thionyl chloride follow the esterification, there is formed ethyl 3-chloro-3-(3-thianaphthenyl)-butyrate (XXII)

which is employed as heretofore described. These reactions may be represented as follows:

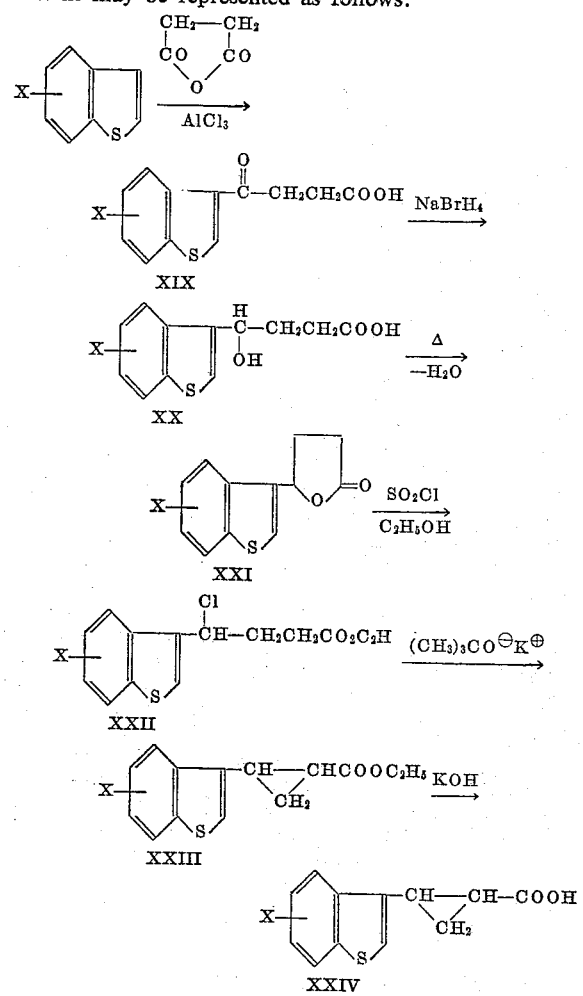

FIGURE VI

In the above procedures for the preparation of our novel compounds, both the cis and trans forms are obtained upon formation of the cyclopropane ring. These individual isomers are then separated either by fractional distillation of the substituted cyclopropanecarboxylic acid ester or by fractional crystallization of the substituted cyclopropanecarboxylic acid and the individual forms then separately subjected to the subsequent reaction procedures to obtain the correspond-cyclopropylamine in the desired configuration.

Where, as in the preparation of the indolyl starting materials, the heterocyclic moiety is formed about the benzo moiety, initially present substitution in the meta position of the benzene ring leads to two isomeric products. Thus for example, when the hydrazine of 3-methylaniline is subjected to the reaction sequence described above and represented by FIGURE IV, there are obtained the two isomeric compounds, 2-(4-methyl-2-indolyl)-cyclopropylamine and 2-(6-methyl-2-indolyl)-cyclopropylamine:

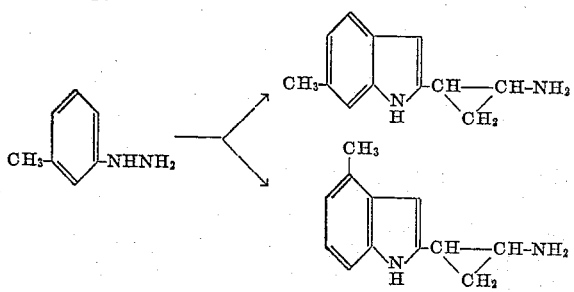

FIGURE VII

These two compounds are readily separated by virtue of their different physical properties, e.g. boiling point or solubility, and separately subjected to the subsequent procedures described herein.

The preferred compounds of our invention are those wherein A represents sulfur and where R and $R_1$ represent hydrogen, namely the 2-(thianaphthenyl)-cyclopropylamines.

The following examples will serve to further typify the nature of our invention, but these examples should not be construed as limiting the scope of our invention, the scope being defined by the appended claims.

Example 1

To a stirred solution of 68 g. (1 mole) of sodium ethoxide in 11 l. of ethanol is added 130 g. (1 mole) of ethyl acetoacetate. The mixture is stirred at room temperature for 30 minutes, after which time the solution is cooled to 0° and 207 g. (1 mole) of ethyl 2-bromomethylcyclopropanecarboxylate in 100 ml. of absolute ethanol is added in a dropwise manner. This mixture is gradually heated to reflux temperature and maintained at this level for 4 hours. At the end of this time the mixture is concentrated with stirring to approximately ⅓ of its original volume, and then poured into 1.5 l. of ice water. The resultant mixture is extracted with ether and these ethereal extracts are dried over magnesium sulfate. The solvent is evaporated under reduced pressure and the residue distilled in vacuo to yield ethyl α-(2-carbethoxycyclopropylmethyl)-acetoacetate.

There is concurrently prepared a solution of benzene diazonium chloride as follows: 9.2 g. (0.1 mole) of aniline and 10 ml. of water are combined and to it is added 50 ml. of concentrated hydrochloric acid. The mixture is gently heated and stirred until a homogeneous solution is obtained and this solution is then cooled in an ice bath. A few pieces of ice are added to this chilled solution and the temperature maintained at 0–5° during the slow addition of 8.5 g. of sodium nitrite in 10 ml. of water. Upon completion of the addition, the resultant reaction mixture is quickly added to a solution prepared by the addition of 12 g. (0.3 mole) of sodium hydroxide in 30 ml. of water, to a solution of 23.3 g. (0.1 mole) ethyl α-(2-carbethoxycyclopropylmethyl)-acetoacetate in 150 ml. of ethanol. To the reaction mixture is added sufficient water to effect complete precipitation of the product, and the product is collected and washed once with water. To 31.8 g. (0.1 mole) of hydrazone product thus obtained is added 450 ml. of 10% ethanolic hydrogen chloride and the mixture refluxed for 3 hours with stirring. At the end of this time the solid precipitate is removed by filtration and the filtrate concentrated in vacuo to a residue. This residue is then dissolved in 200 ml. of ethanol containing 8 g. (.02 mole) of sodium hydroxide. The resulting solution is heated on a steam bath for 1 hour and then excess ethanol is removed under reduced pressure. The residue thus obtained is dissolved in water and the aqueous solution washed several times with ether. The washed aqueous solution is then rendered acidic by the addition of concentrated hydrochloric acid, and the solid thus formed collected by filtration and dried to yield 2-(2-carboxy-3-indolyl)-cyclopropanecarboxylic acid.

A mixture of 22.1 g. (0.1 mole) of 2-(2-carboxy-3-indolyl)-cyclopropanecarboxylic acid and 450 ml. of 5% aqueous hydrochloric acid are refluxed until the evolution of gas ceases (1–6 hours). The resulting mixture is cooled and the solid thus formed collected by filtration. Recrystallization of this solid from aqueous ethanol yield 2-(3-indolyl)-cyclopropanecarboxylic acid.

A suspension of 17.7 g. (0.1 mole) of 2-(3-indolyl)-cyclopropanecarboxylic acid in 20 ml. of water is combined with 50 ml. of acetone. The solution is cooled to 0° C. and 14.9 g. of triethylamine in 230 ml. of acetone are added. The temperature is maintained at 0° while a solution of 15.9 g. of ethyl chlorocarbonate in 65 ml. of acetone is slowly added. Upon completion of the addition, the mixture is stirred for 30 minutes at 10° C. and a solution of 15.2 g. of sodium azide in 45 ml. of water is added in a dropwise fashion. The mixture is stirred for an additional hour after which time it is added to an excess of ice water. The oil which separates is taken up by extracting several times with ether and the combined ethereal extracts then dried over magnesium sulfate. The solvents are next removed under reduced pressure and the residue dissolved in 150 ml. of anhydrous toluene. This solution is heated on a steam bath until the evolution of nitrogen ceases and the residue evaporated in vacuo to yield 2-(3-indolyl)-cyclopropylisocyanate.

This product is then suspended in 350 ml. of 20% aqueous hydrochloric acid and the mixture is refluxed with stirring for 4 hours. At the end of this time, the reaction mixture is concentrated in vacuo to a residue which upon recrystallization from isopropanol and ether yields 2-(3-indolyl)-cyclopropylamine hydrochloride. Treatment of an aqueous solution of this amine hydrochloride with 40% sodium hydroxide solution sufficient to render the solution strongly alkaline then causes the free amine to separate as an oil. This oil is collected by ether extractions and the combined ether extracts dried over magnesium sulfate. Removal of the solvent under reduced pressure then yields the free amine, 2-(3-indolyl)-cyclopropylamine.

Example 2

By following the procedure of Example 1 with 10.7 g. of o-methylaniline being substituted for aniline in the preparation of the diazonium salt, there is prepared upon execution of the steps therein described, the compound 2-(7-methyl-3-indolyl)-cyclopropylamine hydrochloride, which is converted to the free amine according to the procedure described in Example 1. In a similar fashion by employing p-methylaniline and m-methylaniline, there are respectively prepared 2-(5-methyl-3-indolyl)-cyclopropylamine, 2-(6-methyl-3-indolyl)-cyclopropylamine, and 2-(4-methyl-3-indolyl)-cyclopropylamine.

Example 3 p-Bromoaniline (17.1 g.) is substituted for aniline in the procedure of Example 1 and there is thus obtained upon execution of the steps therein described the compound 2-(5-bromo-3-indolyl)-cyclopropylamine. Likewise by employing equivalent amounts of p-chloroaniline, p-iodoaniline and p-fluoroaniline, there are obtained respectively the compounds 2-(5-chloro-3-indolyl)-cyclopropylamine hydrochloride, 2-(5-iodo-3-indolyl)-cyclopropylamine hydrochloride, and 2-(5-fluoro-3-indolyl)-cyclopropylamine hydrochloride.

In a similar manner, equivalent amounts of the following substituted anilines are employed in place of aniline in the procedure of Example 1: p-bromoaniline, o-iodoaniline, o-chloroaniline, m-bromoaniline, m-iodoaniline, m-chloroaniline, m-fluoroaniline. There are thus obtained respectively upon execution of the steps therein described the compounds 2-(7-bromo-3-indolyl)-cyclopropylamine, 2-(7-iodo-3-indolyl)-cyclopropylamine, 2-(7-chloro-3-indolyl)-cyclopropylamine, 2-(6-bromo-3-indolyl)-cyclopropylamine, 2-(4-bromo-3-indolyl)-cyclopropylamine, 2-(6-iodo-3-indolyl)-cyclopropylamine, 2-(4-iodo-3-indolyl)-cyclopropylamine, 2-(6-chloro-3-indolyl)-cyclopropylamine, 2-(4-chloro-3-indolyl)-cyclopropylamine, 2-(6-fluoro-3-indolyl)-cyclopropylamine, and 2-(4-fluoro-3-indolyl)-cyclopropylamine.

Likewise 3,4-dimethoxyaniline and 2-chloro-4-methylaniline are employed in place of aniline in the procedure of Example 1, and there is thus obtained upon execution of the steps therein described the compounds 2-(5,6-dimethoxy-3-indolyl)-cyclopropylamine, 2-(4,5-dimethoxy-3-indolyl)-cyclopropylamine, and 2-(5-methyl-7-chloro-3-indolyl)-cyclopropylamine.

Example 4

A solution of 128 g. (1 mole) of 2-acetylcyclopropanecarboxylic acid in 250 ml. of absolute ethanol is treated with anhydrous hydrogen chloride at 0° for 4 hours. The solution is allowed to stand for an additional 4 hours at room temperature, and then concentrated to a residue at atmospheric pressure. This residue is next distilled in vacuo to yield ethyl 2-acetylcyclopropanecarboxylate.

Alternatively a mixture of equimolar quantities of methylvinyl ketone and ethyldiazoacetate is carefully heated to reflux in the presence of copper powder. Upon cessation of the evolution of nitrogen, the residue is distilled in vacuo to yield a mixture of cis and trans ethyl 2-acetylcyclopropanecarboxylate which may be separated by fractional distillation.

To a mixture of 108 g. (1 mole) of phenylhydrazine and 156 g. (1 mole) of ethyl 2-acetylcyclopropanecarboxylate are added 250 ml. of glacial acetic acid and 70 ml. of water. The mixture is allowed to stand at room temperature for 30 minutes, then cooled to 0°, and rendered strongly alkaline by the addition of 40% aqueous sodium hydroxide solution. This mixture is then stirred at room temperature for 2.5 hours and the hydrazone thus formed extracted with benzene. The benzene extracts are next washed with 5% carbonate solution and dried over magnesium sulfate. Concentration in vacuo affords the crude hydrazone product which is employed in the next step without future purification.

The hydrazone product thus obtained is dissolved in 500 ml. of 10% ethanolic hydrogen chloride and the solution refluxed at steam bath temperature for 2 hours. Concentration in vacuo to ⅓ of the original volume and quenching the solution in 1.5 l. of ice water precipitates the crude product which is extracted with ethyl acetate. The combined extracts are next dried over magnesium sulfate and the solvent removed under reduced pressure. The residue thus obtained is then distilled in vacuo to yield ethyl 2-(2-indolyl)-cyclopropanecarboxylate.

Ethyl 2-(2-indolyl)-cyclopropanecarboxylate (25 g.) is dissolved in 200 ml. of ethanol containing 8 g. of sodium hydroxide. The mixture is heated on a steam bath for 1 hour and the excess ethanol then removed under reduced pressure. The residue thus obtained is dissolved in water and the aqueous solution washed several times with ether. The washed aqueous solution is then rendered acidic by hydrochloric acid and the solid thus formed, collected by filtration and dried to yield 2-(2-indolyl)-cyclopropanecarboxylic acid.

A suspension of 17.7 g. (0.1 mole) of 2-(2-indolyl)-cyclopropanecarboxylic acid in 20 ml. of water is combined with 50 ml. of acetone. The solution is cooled to 0° C. and 14.9 g. of triethylamine in 230 ml. of acetone are added. The temperature is maintained at 0° and a solution of 15.9 g. of ethyl chlorocarbonate in 65 ml. of acetone is slowly added. Upon completion of the addition, the mixture is stirred for 30 minutes at 10° C. and a solution of 15.2 g. of sodium azide in 45 ml. of water is added in a dropwise fashion. The mixture is stirred for an additional hour after which time it is poured into an excess of ice water. The oil which separates is collected by extracting several times with ether and the combined ethereal extracts then dried over magnesium sulfate. The solvents are next removed under reduced pressure and the residue dissolved in 150 ml. of anhydrous toluene. This solution is heated on a steam bath until the evolution of nitrogen ceases and the residue evaporated in vacuo to yield 2-(2-indolyl)-cyclopropylisocyanate as an oil.

This product is then suspended in 350 ml. of 20% aqueous hydrochloric acid and the mixture is refluxed with stirring for 4 hours. At the end of this time the reaction mixture is concentrated in vacuo to a residue which upon recrystallization from isopropanol and ether yields 2-(2-indolyl)-cyclopropylamine hydrochloride.

Treatment of an aqueous solution of this amine hydrochloride with 40% sodium hydroxide solution sufficient to render the solution strongly alkaline then causes the free amine to separate as an oil. This oil is taken up by ether extracts and the combined ether extracts dried over magnesium sulfate. Removal of the solvent under reduced pressure then yields the free amine 2-(2-indolyl)-cyclopropylamine.

*Example 5*

(A) There is substituted for the phenylhydrazine in the procedure of Example 4, 143 g. of o-nitrophenylhydrazine. Completion of the described steps yields 2-(7-nitro-2-indolyl)-cyclopropylamine. Similarly from p-nitrophenylhydrazine, there is obtained 2-(5-nitro-2-indolyl)-cyclopropylamine.

(B) Five grams of 2-(5-nitro-2-indolyl)-cyclopropylamine 2.5 g. of 5% palladium, 18 ml. of water, and 128 ml. of isopropanol are introduced into a stainless-steel hydrogenation apparatus under nitrogen and hydrogenated at an initial pressure of 30 lb./in.$^2$ for eight hours at 25° C. The container is then flushed with nitrogen, 160 ml. of isopropanol are added, the mixture filtered, the volume reduced to about 50 ml. and extracted with 5% hydrochloric acid. These extracts are rendered basic, extracted with ether, and these ethereal extracts dried and reduced to a residue to yield 2-(5-amino-2-indolyl)-cyclopropylamine.

*Example 6* p-Fluorophenylhydrazine (126 g.) is employed in the procedure of Example 4. Completion of the described steps yields 2-(5-fluoro-2-idolyl)-cyclopropylamine.

Likewise, equivalent amount of p-chlorophenylhydrazine, p-methoxyphenylhydrazine and o-ethylphenylhydrazine are employed in the procedure of Example 4. There are thus obtained the compounds 2-(5-chloro-2-indolyl)-cyclopropylamine, 2-(5-methoxy-2-indolyl) - cyclopropyl - amine and 2-(7-ethyl-2-indolyl)-cyclopropylamine.

*Example 7*

Five grams of 2-(3-indolyl)-cyclopropylamine are dissolved in ethyl acetate and treated with an equivalent amount of maleic acid. The solution is allowed to stand for several hours, then cooled and the solid so formed collected by filtration to yield 2-(3-indolyl)-cyclopropylamine maleate.

In a similar fashion by employing citric acid, mandelate acid, glacial acetic acid, tartaric acid and the like, there is prepared the corresponding acid addition salts.

*Example 8*

A solution of 20.1 g. of 2-(5-methoxy-2-indolyl)-cyclopropylamine in 100 ml. of ethylformate is refluxed for 17 hours. The excess ethylformate is evaporated in vacuo to yield a residue comprising of N-formyl 2-(5-methoxy-2-indolyl)-cyclopropylamine.

To a stirred solution of 23.9 g. of N-formyl 2-(5-methoxy-2-indolyl)-cyclopropylamine in 150 ml. of diethylene glycol dimethyl ether is added 5.2 g. of 54.5% suspension of sodium hydroxide in mineral oil. The mixture is refluxed for 2 hours, cooled and an additional 5.2 g. of the sodium hydroxide dispersion is added. The mixture is refluxed for an additional 2 hours, cooled and 67 ml. of methyl iodide are added. After standing for 16 hours at room temperature, the mixture is refluxed for 8 hours employing an acetone-Dry Ice condenser. At the end of this time the mixture is allowed to stand for 72 hours at room temperature after which period 20 ml. of methyl iodide are added and the mixture again refluxed for 4 hours employing an acetone-Dry Ice condenser. Filtration of the mixture and concentration in vacuo of the filtrate to approximately 70 ml. then yields a residual liquid which when poured into 1 l. of ice water precipitates as an oil. The oil is extracted with methylene chloride, the extracts dried over magnesium sulfate and the solvents removed in vacuo. Distillation of the residual oil then yields N-methyl-N-formyl 2-(5-methoxy-2-indolyl)-cyclopropylamine.

A mixture of 11.6 g. of N-methyl-N-formyl 2-(5-methoxy-2-indolyl)-cyclopropylamine and 100 ml. of 37% hydrochloric acid is refluxed with stirring for 20 hours. The mixture is then extracted with ether and the aqueous portion concentrated in vacuo. A solution of the resultant crystalline residue in 200 ml. of water is extracted with ether, and the aqueous fraction rendered strongly alkaline by the addition of 40% aqueous sodium hydroxide solution. This alkaline solution is then extracted with ether, the ether extracts dried over magnesium sulfate and the solvents removed in vacuo to yield 2-(5-methoxy-2-indolyl)-cyclopropylmethylamine.

*Example 9*

A 40% aqueous solution of formaldehyde (5.1 g.) is added to a cooled solution of 4.1 g. of 2-(6-chloro-3-indolyl)-cyclopropylamine in 6.6 g. of 90% formic acid. The mixture is then refluxed for 18 hours after which time the cooled reaction mixture is treated with 2.7 ml. of concentrated hydrochloric acid. Evaporation of the solution to a residue and treatment of this residue with 50% potassium hydroxide solution followed by extractions with ether yields an ethereal solution of 2-(6-chloro-3-indolyl)-cyclopropyldimethylamine which compound is isolated by drying the ethereal solution and evaporating it to a residue.

An ethereal solution of the free base is treated with ethereal hydrogen chloride to yield the corresponding hydrochloride salt.

*Example 10*

A mixture of 18.5 g. of 2-(5-methyl-3-indolyl)-cyclopropylamine, 22.9 g. of 1,5-dibromopentane and 30.0 g. of potassium carbonate in 200 ml. of xylene is refluxed for 14 hours. The cooled reaction mixture is treated with water, the xylene layer separated and evaporated to a residue which comprises 1-piperadinyl 2-(5-methyl-3-indolyl)-cyclopropane.

*Example 11*

To 150 g. of carbon disulfide is added 55 g. (.47 mole) of benzofuran. The mixture is stirred vigorously with cooling and to it is added in a dropwise fashion 75 g. (.47 mole) of bromine in 150 g. of carbon disulfide. The rate of addition is adjusted so that the temperature does not exceed −5° C. Upon completion of the addition, the solution is filtered and the solid so collected recrystallized from chloroform to yield benzofurandibromide.

A total of 28 g. (0.1 mole) of benzofurandibromide is added in several portions to a cooled solution of 12 g. of potassium hydroxide in absolute ethanol. Upon completion of the addition, the mixture is allowed to attain room temperature and is then refluxed with stirring for 2 hours. At the end of this time the mixture is steam distilled and the organic layer is separated from the distillate. This layer is washed once with water and dried over sodium sulfate to yield 3-bromobenzofuran.

A mixture of 19.7 g. (0.1 mole) of 3-bromobenzofuran, 9.8 g. (0.11 mole) of cuprous cyanide and 20 ml. of pyridine is heated for 18 hours at 215–240° C. The reaction mixture is then treated with aqueous ammonium hydroxide and extracted with benzene. The benzene extracts are then evaporated to a residue at steam bath temperature and the residue recrystallized from cyclohexane to yield 3-cyanobenzofuran, M.P. 93°.

To a solution of 25.0 g. of methyl magnesium iodide in anhydrous ether is added 14.3 (.1 mole) of 3-cyanobenzofuran in a dropwise fashion. During the addition, the reaction is controlled as required by cooling. Upon completion of the addition, the mixture is refluxed for 1 hour. The solution is then cooled and an aqueous ammonium chloride solution is added. The reaction mixture is then extracted with ether and the ethereal extracts washed with 10% sulfuric acid and then with water, after which they are dried over magnesium sulfate. The solvents are evaporated and the residual material distilled to yield 3-benzofurylmethyl ketone.

A solution of 16.0 g. (0.1 mole) of 3-benzofurylmethyl ketone in 20 ml. of anhydrous ether is added dropwise to a suspension of 1.9 g. (0.05 mole) of lithium aluminum hydride in 50 ml. of anhydrous ether. The mixture is then heated at reflux for 30 minutes. There is next cautiously added 2 ml. of water to decompose the reaction mixture and the resultant mixture is then filtered. The filtrate is then extracted with ether and the ethereal extracts thus obtained dried over magnesium sulfate. Evaporation of the dried ethereal solution and distillation of the residue then yields 3-($\alpha$-hydroxyethyl)-benzofuran.

3-($\alpha$-hydroxyethyl)-benzofuran is then passed through an alumina dehydration apparatus at 350–400° C. and the product collected in a cold trap according to standard procedures to yield 3-vinylbenzofuran. 3-vinylbenzofuran (24.4 g.) and 35.5 g. of ethyldiazoacetate are mixed at 0° C. and the mixture heated gradually to 150° C. The reaction temperature is maintained at this level for 3 hours and the mixture then distilled under reduced pressure. The main fraction collected consists essentially of ethyl 2-(3-benzofuryl)-cyclopropanecarboxylate.

A mixture of 25 g. of ethyl 2-(3-benzofuryl)-cyclopropanecarboxylate of 8 g. of potassium hydroxide, and 200 ml. of 95% ethanol is heated at reflux temperature for 4 hours. The solvents are then removed in vacuo and the resultant solid dissolved in water. This aqueous solution is then adjusted to pH 2 by the addition of hydrochloric acid and the precipitate which forms collected by filtration to yield trans 2-(3-benzofuryl)-cyclopropanecarboxylic acid. The mother liquor from the above crystallization is concentrated in vacuo to yield cis 2-(3-benzofuryl)-cyclopropanecarboxylic acid.

A suspension of 17.9 g. (0.1 mole) of 2-(3-benzofuryl)-cyclopropanecarboxylic acid in 70 ml. of water is combined with 50 ml. of acetone. The solution is cooled to 0° and 14.9 g. of triethylamine in 230 ml. of acetone are added. The temperature is maintained at 0° and a solution of 15.9 g. of ethylchlorocarbonate in 65 ml. of acetone is slowly added. Upon completion of the addition, the mixture is stirred for 30 minutes at 10° C. and a solution of 15.2 g. of sodium azide in 45 ml. of water is added in a dropwise fashion. The mixture is stirred for an additional hour, after which time it is poured into an excess in ice-water. The oil which separates is collected by extracting several times with ether and the combined ethereal extracts are then dried over magnesium sulfate. The solvents are next removed under reduced pressure and the residue dissolved in 100 ml. of anhydrous toluene. This solution is heated on a steam bath until the evolution of nitrogen ceases and the residue evaporated in vacuo to yield 2-(3-benzofuryl)-cyclopropanoiisocyanate.

This product is then suspended in 350 ml. of 20% aqueous hydrochloric acid and the mixture is refluxed with stirring for 4 hours. At the end of this time the reaction mixture is concentrated in vacuo to a residue which upon recrystallization from isopropanol and ether yields 2-(3-benzofuryl)-cyclopropylamine hydrochloride.

An aqueous solution of this amine hydrochloride is treated with sufficient 40% sodium hydroxide solution to render the solution strongly alkaline and the oil which separates is collected by extractions with ether. These combined ether extracts are dried over magnesium sulfate and evaporated to a residue consisting of 2-(3-benzofuryl)-cyclopropylamine.

Example 12

5-chlorobenzofuran (71 g.) is substituted for benzofuran in the procedure of Example 11. Upon execution of the procedures therein recited in their respective order, there is obtained the compound 2-(5-chloro-3-benzofuryl)-cyclopropylamine.

In a similar manner by employing 6-chlorbenzofuran and 7-chlorobenzofuran, there are obtained respectively the compounds 2-(6-chloro-3-benzofuryl)-cyclopropylamine and 2-(7-chloro-3-benzofuryl)-cyclopropylamine.

Example 13

In place of benzofuran in the procedure of Example 1 there is employed 61.4 g. of 4-methylbenzofuran. Upon completion of the steps therein described, there is thus obtained the compound 2-(4-methyl-3-benzofuryl)-cyclopropylamine.

Likewise by employing 5-methylbenzofuran, 6-methylbenzofuran and 7-methylbenzofuran, there are respectively obtained the compounds 2-(5-methyl-3-benzofuryl)-cyclopropylamine, 2-(6-methyl-3-benzofuryl)-cyclopropylamine, and 2-(7-methyl-3-benzofuryl)-cyclopropylamine.

Example 14

5-methoxybenzofuran (69 g.) is employed in the procedure of Example 1 and there is thus obtained upon completion of the procedures therein recited the compound 2-(5-methoxy-3-benzofuryl)-cyclopropylamine.

In an analogous fashion by employing 6-methoxybenzofuran and 7-methoxybenzofuran in the method of Example 11, there are respectively obtained the compounds 2 - (6 - methoxy - 3 - benzofuryl) - cyclopropylamine and 2 - (7 - methoxy - 3 - benzofuryl) - cyclopropylamine.

Example 15

One mole of salicylaldehyde (122 g.) is dissolved in 400 ml. of ethanol and refluxed with 56 g. of potassium hydroxide until a solution of the potassium salt is obtained. There is then slowly added with stirring 92.5 g. (1 mole) of chloroacetone. When the reaction has subsided, an equal volume of water is added and the resultant mixture distilled to remove excess ethanol. The residual material is extracted with ether and the ethereal solutions dried over magnesium sulfate. Removal of the solvents under reduced pressure to yield a residue and recrystallization of this residue from ethanol yields 2-acetylbenzofuran.

To a suspension of 19 g. (0.5 mole) lithium aluminum hydride in 500 ml. of anhydrous ether is added in a dropwise fashion, 160 g. (1 mole) of 2-benzofurylmethyl ketone in 200 ml. of anhydrous ether. This mixture is refluxed for 1 hour and then decomposed by the dropwise sequential addition of 17 ml. of water, 17 ml. of 10% aqueous sodium hydroxide and 57 ml. of water. The precipitated salts are removed from the solution by filtration and the filtrate concentrated to an oil which upon distillation in vacuo, affords 2-($\alpha$-hydroxyethyl)-benzofuran.

A solution of 2-($\alpha$-hydroxymethyl)-benzofuran in 500 ml. of benzene is passed through a vertical stainless steel column (1″ x 18″), which is packed with alumina pellets and maintained at a temperature of 520°, ±10°. The resultant benzene solution which is collected is washed once with 100 ml. of water and dried over magnesium sulfate. The solvent is next removed under reduced pressure and the residual oil distilled in vacuo to yield 2-vinylbenzofuran.

2-vinylbenzofuran (24.4 g.) and 35.5 g. of ethyl diazoacetate are mixed at 0° and the mixture gradually heated to 150°. The reaction temperature is maintained at this level for 3 hours and the mixture then distilled under reduced pressure. The main fraction thus collected consists essentially of ethyl 2-(2-benzofuryl)-cyclopropanecarboxylate.

A mixture of 25 g. of ethyl 2-(2-benzofuryl)-cyclopropanecarboxylate, 8 g. of potassium hydroxide and 200 ml. of 95% ethanol is heated at reflux temperature for 4 hours. The solid is then removed in vacuo and the resultant solid dissolved in water. This aqueous solution is then adjusted to pH 2 by the addition of hydrochloric acid and the precipitate which forms collected by filtration to yield trans 2-(2-benzofuryl)-cyclopropanecarboxylic acid. The mother liquor from the above crystallization is concentrated in vacuo to yield cis 2-(2-benzofuryl)-cyclopropanecarboxylic acid.

A suspension of 17.9 g. (0.1 mole) of 2-(2-benzofuryl)-cyclopropanecarboxylic acid in 70 ml. of water is combined with 50 ml. of acetone. The solution is cooled to 0° and 14.9 g. of triethylamine in 230 ml. of acetone are added. The temperature is maintained at 0° and a solution of 15.9 g. of ethylchlorocarbonate in 65 ml. of acetone is slowly added. Upon completion of the addition, the mixture is stirred for 30 minutes at 10° and a solution of 15.2 g. of sodium oxide in 45 ml. of water is added in a dropwise fashion. The mixture is stirred for an additional hour, after which time is is poured into an excess of ice water. The oil which separates is collected by extracting several times with ether and the combined ethereal extracts are then dried over magnesium sulfate. Solvents are next removed under reduced pressure and the residue dissolved in 100 ml. of anhydrous toluene. This solution is heated on a steam bath until the evolution of nitrogen ceases and the residue then evaporated in vacuo to yield 3-(2-benzofuryl)-cyclopropanolisocyanate.

This product is then suspended in 350 ml. of 20% aqueous hydrochloric acid and the mixture is refluxed with stirring for 4 hours. At the end of this time the reaction mixture is concentrated in vacuo to a residue, which upon recrystallization from isopropanol and ether yields 2-(2-benzofuryl)-cyclopropylamine hydrochloride.

An aqueous solution of this amine hydrochloride is treated with sufficient 40% sodium hydroxide solution to render the solution strongly alkaline and the oil which separate is collected by extractions with ether. These combined ethereal extracts dried over magnesium sulfate and evaporated to a residue consisting of 2-(2-benzofuryl)-cyclopropylamine.

*Example 16*

4-bromosalicylaldehyde (201 g.) is substituted for salicylaldehyde in the procedure for Example 15 and upon execution of the steps therein described, there is obtained 2-(6-bromo-2-benzofuryl)-cyclopropylamine.

In a similar manner by employing equivalent amounts of 3-bromosalicylaldehyde, 5-bromosalicylaldehyde, 5-chlorosalicylaldehyde, 4-fluorosalicylaldehyde, and 3-fluorosalicylaldehyde, there are obtained respectively the compounds 2-(7-bromo-2-benzofuryl)-cyclopropylamine, 2-(5-bromo-2-benzofuryl)-cyclopropylamine, 2-(5-chloro-2-benzofuryl)-cyclopropylamine, 2-(6-fluoro-2-benzofuryl)-cyclopropylamine, and 2-(7-fluoro-2-benzofuryl)-cyclopropylamine.

*Example 17*

5-methylsalicylaldehyde (136 g.) is employed in place of salicylaldehyde in the procedure is Example 15. Upon completion of the recited steps in their respective order, there is obtained the compound 2-(5-methyl-2-benzofuryl)-cyclopropylamine.

Similarly by employing 5-ethylsalicylaldehyde and 3-butylsalicylaldehyde, there are obtained the compounds 2-(5-ethyl-2-benzofuryl)-cyclopropylamine and 2-(7-butyl-2-benzofuryl)-cyclopropylamine.

*Example 18*

3-methoxysalicylaldehyde (152 g.) is employed in place of salicylaldehyde in the procedure of Example 15. Completion of the steps described and purification in the prescribed manner then yields 2-(7-methoxy-2-benzofuryl)-cyclopropylamine.

In an analogous manner, 4-methoxysalicylaldehyde, 4-ethoxysalicylaldehyde and 3-ethoxysalicylaldehyde are employed in the procedure of Example 15 and there are respectively obtained 2-(6-methoxy-2-benzofuryl)-cyclopropylamine, 2-(6-ethoxy-2-benzofuryl)-cyclopropylamine, and 2-(7-ethoxy-2-benzofuryl)-cyclopropylamine.

*Example 19*

6-nitrosalicylaldehyde (167 g.) is subjected to the procedure described in Example 15 and upon completion of the recited steps there is formed 2-(4-nitro-2-benzofuryl)-cyclopropylamine.

In a similar fashion by employing 4-nitrosalicylaldehyde there is obtained 2-(6-nitro-2-benzofuryl)-cyclopropylamine.

Subjection of these individual compounds to the hydrogenation procedure described in Example 5B then yields 2-(4-amino-2-benzofuryl)-cyclopropylamine and 2-(6-amino-benzofuryl)-cyclopropylamine.

*Example 20*

Five grams of 2-(3-benzofuryl)-cyclopropylamine are dissolved in ethyl acetate and treated with an equivalent amount of maleic acid. The solution is allowed to stand for several hours, then cooled and the solid so formed collected by filtration to yield 2-(3-benzofuryl)-cyclopropylamine maleate.

In a similar fashion by employing citric acid, mandelic acid, glacial acetic acid, tartaric acid and the like, there is prepared the corresponding acid addition salts.

*Example 21*

A solution of 20.3 g. of 2-(5-methyl-2-benzofuryl)-cyclopropylamine in 100 ml. of ethylformate is refluxed for 17 hours. The excess ethylformate is evaporated in vacuo to yield a residue comprising of N-formyl 2-(5-methyl-2-benzofuryl)-cyclopropylamine.

To a stirred solution of 24.1 g. of N-formyl 2-(5-methyl-2-benzofuryl)-cyclopropylamine in 150 ml. of diethylene glycol dimethyl ether is added 5.2 g. of 54.5% suspension of sodium hydroxide in mineral oil. The mixture is refluxed for 2 hours, cooled and an additional 5.2 g. of the sodium hydroxide dispersion is added. The mixture is refluxed for an additional 2 hours, cooled and 67 ml. of methyl iodide are added. After standing for 16 hours at room temperature, the mixture is refluxed for 8 hours employing an acetone-Dry Ice condenser. At the end of this time the mixture is allowed to stand for 72 hours at room temperature after which period 20 ml. of methyl iodide are added and the mixture again refluxed for 4 hours employing an acetone-Dry Ice condenser. Filtration of the mixture and concentration in vacuo of the filtrate to approximately 70 ml. then yields a residual liquid which when poured into 1 l. of ice water precipitates as an oil. The oil is extracted with methylene chloride, the extracts dried over magnesium sulfate and the solvents removed in vacuo. Distillation of the residual oil then yields N-methyl-N-formyl 2-(5-methyl-2-benzofuryl)-cyclopropylamine.

A mixture of 11.8 g. of N-methyl-N-formyl 2-(5-methyl-2-benzofuryl)-cyclopropylamine and 100 ml. of 37% hydrochloric acid is refluxed with stirring for 20 hours. The mixture is then extratcted with ether and the aqueous portion concentrated in vacuo. A solution of the resultant crystalline residue in 200 ml. of water is extracted with ether, and the aqueous fraction rendered strongly alkaline by the addition of 40% aqueous sodium hydroxide solution. This alkaline solution is then extracted with ether, the ether extracts dried over magnesium sulfate and the solvents removed in vacuo to yield 2-(5-methyl-2-benzofuryl)-cyclopropylmethylamine.

*Example 22*

A 40% aqueous solution of formaldehyde (5.1 g.) is added to a cooled solution of 4.1 g. of 2-(6-chloro-3-benzofuryl)-cyclopropylamine in 6.6 g. of 90% formic acid. The mixture is then refluxed for 18 hours after which time the cooled reaction mixture is treated with 2.7 ml. of concentrated hydrochloric acid. Evaporation of the solution to a residue and treatment of this residue with 50% potassium hydroxide solution followed by extractions with ether yields an ethereal solution of 2-(6-chloro-3-benzofuryl)-cyclopropyldimethylamine which compound is isolated by drying the ethereal solution and evaporating it to a residue.

An ethereal solution of the free base is treated with ethereal hydrogen chloride to yield the corresponding hydrochloride salt.

*Example 23*

A mixture of 18.5 g. of 2-(5-methoxy-3-benzofuryl)-cyclopropylamine, 22.9 g. of 1,5-dibromopentane and 30.0 g. of potassium carbonate in 200 ml. of xylene is refluxed for 4 hours. The cooled reaction mixture is treated with water, the xylene layer separated and evaporated to a residue which comprises 1-piperadinyl-2-(5-methoxy-3-benzofuryl)-cyclopropane.

*Example 24*

A chilled solution of 29.5 g. (.217 mole) of N-butyl-bromide in 40 ml. of anhydrous ether is added in a dropwise fashion to a chilled suspension of 3.6 g. (5.35 moles) of finely cut lithium wire in 70 ml. of anhydrous ether. The reaction mixture is cooled in an ice bath during the addition and upon completion of the addition, it is refluxed for 1 hour with stirring. The reaction mixture is then filtered and cooled in an ice bath. There are next added 19.3 g. (1.44 moles) of thianaphthene in 30 ml. of anhydrous ether. Upon completion of the addition, the mixture is refluxed for 45 minutes.

To this ethereal solution of thianaphthene lithium are slowly added 225 g. (5.0 moles) of acetaldehyde in 500 ml. of chilled anhydrous ether. The mixture is heated at reflux temperature for 1 hour and at the end of this time, poured into 5 l. of ice water which has been saturated with ammonium chloride. The organic layer is then separated and the aqueous layer extracted three times with ether. The combined organic layers are dried over sodium carbonate and distilled in vacuo to yield 1-(2-thianaphthenyl)-ethanol.

To 750 ml. of acetic anhydride is added 148 g. (0.832 mole) of 1-(2-thianaphthenyl)-ethanol and the mixture is refluxed for 90 minutes. At the end of this time, the excess acetic anhydride is removed in vacuo and 300 ml. of water and 300 ml. of ether are then added to the cooled residue. The organic layer is separated and the aqueous layer extracted three times with ether. The combined organic layer and organic extracts are washed with two portions of water, dried over magnesium sulfate and evaporated under reduced pressure. The residue is then distilled in vacuo to yield 1-(2-thianaphthenyl)-ethyl acetate, B.P. 123–129°/.03 mm.

A 1 x 12 inch column is packed with 10 x .06 mm. glass cylinders and fitted with a condenser and receiver at the lower outlet. A slow stream of nitrogen is then swept through the system. The column is then heated to 460–480° by means of an electric furnace and 147.6 g. (.067 mole) of 1-(2-thianaphthenyl)-ethyl acetate is introduced dropwise at the top of the column. At the completion of the addition, the column is allowed to cool. Upon attaining room temperature, the flow of nitrogen is ceased and the column flushed with a small amount of benzene. The solid product collected below the condenser is dissolved in sufficient ether and washed with dilute aqueous sodium bicarbonate solution and with water. The washed ethereal solution is next dried over magnesium sulfate and then evaporated under reduced pressure. The residue is distilled in vacuo to yield 2-vinylthianaphthene as a solid, B.P. 78°/0.3 ml.

2-vinylthianaphthene (78.7 g. in 0.492 mole) is added to 65 g. (0.57 mole) of ethyl diazoacetate. A small amount of the resultant solution is placed in a three-neck flask under nitrogen and the flask heated to 100°. The remaining solution is then slowly added in a dropwise manner maintaining an internal temperature from 100° to 120° C. Upon completion of the addition, the internal temperature is raised to 150° and maintained at this level for 5 hours. At the end of this time the resultant oil is distilled in vacuo to yield ethyl 2-(2-thianaphthenyl)-cyclopropanecarboxylate, B.P. 139°–145°/0.5–1.2 mm., M.P. 75–80°.

A mixture of 85.8 g. (0.349 mole) of 2-(2-thianaphthenyl)-cyclopropanecarboxylate and 39.8 g. of sodium hydroxide in 133 ml. of water and 750 ml. of #30 alcohol is stirred at reflux for 8 hours. At the end of this time the solution is evaporated under reduced pressure and the residue so obtained dissolved in water. This aqueous solution is then washed 3 times with ether and the ethereal extracts in turn washed with dilute sodium hydroxide. The combined aqueous solutions are next acidified by the careful addition of concentrated hydrochloric acid and the solid thus formed collected by filtration and dried to yield 2-(2-thianaphthenyl)-cyclopropanecarboxylic acid, M.P. 128–145°, which upon recrystallization from toluene is raised to 166–168°.

A mixture of 23.9 g. (0.1095 mole) of 2-(2-thianaphthenyl)-cyclopropanecarboxylic acid and 50 ml. of thionyl chloride are allowed to stand at room temperature for approximately 15 hours. At the end of this time, the brown solution is distilled in vacuo under 35° C. to remove the excess thionyl chloride. Two portions of 50 ml. each of benzene are next added and the resultant mixture evaporated in vacuo at 35° C. after the addition of each portion. The brown residue thus obtained consisting essentially of 2-(2-thianaphthenyl)-cyclopropanecarboxyl chloride is dissolved in 500 ml. of acetone and cooled in an ice bath with stirring while there is added in a dropwise fashion, 14.0 g. (0.215 mole) of sodium azide in 80 ml. of water. Upon completion of the addition, the mixture is stirred at 0° C. for 1 hour and then poured into water. The resultant mixture is extracted 3 times with ether and the ethereal extracts washed once with water and dried over magnesium sulfate. The ether is then evaporated under reduced pressure, leaving a residue consisting essentially of 2-(2-thianaphthenyl)-cyclopropanecarbonyl azide (explosive upon heating). This material is dissolved in 400 ml. of dry toluene and heated on a steam bath until the evolution of nitrogen has ceased. The solution is then heated at reflux for 1 hour and evaporated under reduced pressure to yield 2-(2-thianaphthenyl)-cyclopropanolisocyanate as an oil. This material is then dissolved in 400 ml. of benzene and to the solution is added 40 ml. of a 50% aqueous potassium hydroxide solution. The mixture is heated at reflux with stirring for 1 hour. At the end of this time the mixture is cooled and rendered acidic by addition of dilute hydrochloric acid. The organic layer is then separated, washed twice with dilute hydrochloric acid and the combined aqueous acidic layers then washed with ether. The washed aqueous solution is rendered basic by the addition of 40% aqueous sodium hydroxide solution, and the resultant basic solution extracted 3 times with ether. These ethereal extracts are in turn washed with water and dried over magnesium sulfate. The solvent is next evaporated under reduced pressure to leave a residue consisting essentially of 2-(2-thianaphthenyl)-cyclopropylamine as a whole solid. This material is then dissolved in a sufficient quantity of #30 alcohol and acidified by the dropwise addition of a solution of hydrogen chloride in ether. Additional ether is then added and the solid thus formed collected by filtration to yield 2-(2-thianaphthenyl)-cyclopropylamine hydrochloride, M.P. 199–204°.

An aqueous solution of this amine hydrochloride upon treatment with base yields the free amine which is separated by extraction with ether to yield 2-(2-thianaphthenyl)-cyclopropylamine.

Example 25

5-bromothianaphthene (46.2 g.) is employed in place of a thianaphthene in the procedure of Example 24. Upon completion of the steps therein recited in their respective order, there is obtained 2-(5-bromo-2-thianaphthenyl)-cyclopropylamine.

In a similar manner, 4-bromothianaphthene, 6-bromothianaphthene and 7-bromothianaphthene are employed and there is thus obtained the compounds 2-(4-bromo-2-thianaphthenyl)-cyclopropylamine, 2-(6-bromo-2-thianaphthenyl)-cyclopropylamine and 2-(7-bromo-2-thianaphthenyl)-cyclopropylamine.

Likewise by employing 36.6 g. of 6-chlorothianaphthene in the procedure of Example 24, there is obtained upon execution of the steps therein recited, 2-(6-chloro-2-thianaphthenyl)-cyclopropylamine. Also 4-chlorothianaphthene, 5-chlorothianaphthene and 7-chlorothianaphthene when substituted for the starting material of Example 24 yields respectively 2-(4-chloro-2-thianaphthenyl)-cyclopropylamine, 2-(5-chloro-2-thianaphthenyl)-cyclopropylamine and 2-(7-chloro-2-thianaphthenyl)-cyclopropylamine.

Example 26

4-methylthianaphthene (32.1 g.) is employed in place of thianaphthene in the procedure of Example 24, and upon execution of the steps therein described, there is obtained the compound 2-(4-methylthianaphthenyl)-cyclopropylamine.

In a similar manner, equivalent amounts of the following compounds may be substituted for thianaphthene in the procedure of Example 24: 5-methylthianaphthene, 6-methylthianaphthene, 7-methylthianaphthene, 5-ethylthianaphthene, 5-butylthianaphthene and 5-trifluoromethylthianaphthene. There are thus obtained respectively the following compounds:

2-(5-methyl-2-thianaphthenyl)-cyclopropylamine,
2-(6-methyl-2-thianaphthenyl)-cyclopropylamine,
2-(7-methyl-2-thianaphthenyl)-cyclopropylamine,
2-(5-ethyl-2-thianaphthenyl)-cyclopropylamine,
2-(5-butyl-2-thianaphthenyl)-cyclopropylamine, and
2-(5-trifluoromethyl-2-thianaphthenyl)-cyclopropylamine.

Example 27

5-methoxythianaphthene (35.6 g.) is employed as a starting material in place of thianaphthene in Example 24 and upon execution of the prescribed steps, there is obtained the compound 2-(5-methoxy-2-thianaphthenyl)-cyclopropylamine hydrochloride. Similarly by employing equivalent amounts of 6-methoxythianaphthene, 7-methoxythianaphthene, and 6-butoxythianaphthene, there are respectively obtained the compounds 2-(6-methoxy-2-thianaphthenyl)-cyclopropylamine, 2-(7-methoxy-2-thianaphthenyl)-cyclopropylamine, and 2-(6-butoxy-2-thianaphthenyl)-cyclopropylamine.

In a similar manner 5-nitrothianaphthene upon execution of the recited steps yields 2-(5-nitro-2-thianaphthenyl)-cyclopropylamine and 5-hydroxythianaphthene 2-(5-hydroxy-2-thianaphthenyl)-cyclopropylamine.

Example 28

A solution of 54 g. (0.4 mole) of thianaphthene and 40 g. (0.4 mole) of succinic anhydride in 200 ml. of nitrobenzene is cooled in an ice bath while 80 g. of aluminum chloride are added with stirring over a one hour period. At the end of this time, the mixture is allowed to remain in the ice bath and stirred for 15 hours, allowing the ice to melt gradually over this period and the mixture to attain room temperature. At the end of this time, the reaction mixture is cautiously poured into 400 ml. of ice water and 400 ml. of concentrated hydrochloric acid. The resultant mixture is next extracted three times with methylene chloride and the methylene chloride extracts then washed with water. Extraction of the washed methylene chloride reaction with dilute sodium hydroxide, an ethereal wash of these aqueous extracts and acidification with concentrated hydrochloric acid then yields a solid which is in turn extracted with methylene chloride. These methylene chloride extracts are washed twice with water, dried over magnesium sulfate, and evaporated in vacuo to a residue. The residue so obtained is next extracted with five 500 ml. portions of hot benzene and the resultant benzene solution is then clarified by filtration through "Super-Cel." Concentration of the filtrate to approximately 100 ml. followed by cooling then yields 3-oxo-3-(3-thianaphthenyl)-butyric acid which is further purified by recrystallization from benzene.

To a solution of 76.2 g. (0.325 mole) of 3-oxo-3-(3-thianaphthenyl)-butyric acid in 160 ml. of 10% aqueous sodium hydroxide solution and 100 ml. of water are slowly added 88 ml. of a stabilized sodium borohydride solution (containing 15.14 g. (0.4 mole) of sodium borohydride). The reaction mixture is then stirred at room temperature for 1 hour, cooled in an ice bath, and acidified by the slow addition of hydrochloric acid. The resultant acidic solution is next extracted with ether and the ethereal solution washed with water, dried over magnesium sulfate and evaporated in vacuo to yield 3-hydroxy-3-(3-thianaphthenyl)-butyric acid.

3-hydroxy-3-(3-thianaphthenyl)-butyric acid is then heated in vacuo at a temperature of 140° for 2½ hours to yield 3-hydroxy-3-(3-thianaphthenyl-butyric acid γ-lactone.

This lactone is dissolved in 100 ml. of dried benzene, 109 ml. of thionyl chloride are then added, and the mixture refluxed for 4 hours. The solution is cooled in an ice bath and 315 ml. of a saturated ethanolic hydrogen chloride solution are slowly added. Upon completion of the addition, the solution is allowed to stand for 15 hours at room temperature and the solvents then removed in vacuo. Several portions of benzene are added, each portion removed in vacuo after the addition, and the resultant material then distilled in a molecular still to yield ethyl 3-chloro-3-(3-thianaphthenyl)-butyrate.

A solution of 135 ml. of t-butanol and 460 ml. of anhydrous benzene is stirred under nitrogen at 60° while 10 g. (0.256 mole) of finely cut potassium are slowly added. The mixture is stirred at reflux for 1 hour and 58 g. (0.205 mole) of ethyl 3-chloro-3-(3-thianaphthenyl)-butyrate are then slowly added. Upon completion of the addition, the resultant mixture is stirred at reflux for 5 hours and then allowed to stand for 15 hours. Two hundred-fifty milliliters of water are then added to the mixture and the layer separated. The aqueous solution is extracted twice with benzene and these extracts combined with the organic layer. The combined organic solutions are washed with water, dried over magnesium sulfate and evaporated in vacuo to a residue. This residue is then dissolved in 125 ml. of acetone and treated with 3.5 ml. of 1% potassium permanganate solution. The resultant mixture is diluted with water and extracted three times with ether. These ethereal extracts are washed with a saturated aqueous sodium chloride solution, dried over magnesium sulfate, and evaporated under reduced pressure to a residue, which upon distillation in vacuo yields ethyl 2-(3-thianaphthenyl)-cyclopropanecarboxylate.

A solution of 27.83 g. (0.113 mole) of ethyl 2-(3-thianaphthenyl)-cyclopropanecarboxylate and 12.9 g. of sodium hydroxide in 45 ml. of water and 238 ml. of #30 alcohol are stirred at reflux for 9 hours. At the end of this time the solution is evaporated in vacuo and the residue dissolved in water. The aqueous solution is washed three times with ether and the ethereal extracts washed with dilute sodium hydroxide. These alkaline extracts are combined with the aqueous layer and the combined aqueous solutions acidified by the addition of concentrated hydrochloric acid. The oil which separates and solidified upon cooling is collected and recrystallized from toluene to give 2-(3-thianaphthenyl)-cyclopropane-carboxylate acid.

A mixture of 19.74 g. (0.0905 mole) of 2-(3-thianaphthenyl)-cyclopropanecarboxylic acid and 40 ml. of thionyl chloride are allowed to stand at room temperature for 15 hours. The excess thionyl chloride is then removed in vacuo at a temperature below 30° C. Two portions of dried benzene are then added and removed in vacuo at a temperature of 35° C., the remaining residue consisting essentially of 2-(3-thianaphthenyl)-cyclopropane-carbonyl chloride. This material is next dissolved in 410 ml. of acetone and stirred at 0° while a solution of 11.8 g. (0.181 mole) of sodium azide in 50 ml. of water are added in a dropwise fashion. The resultant mixture is stirred for 1 hour and then poured into ice water. This aqueous solution is then washed with three portions of ether and the ethereal extracts in turn washed with water, dried over magnesium sulfate, and evaporated in vacuo at a temperature under 35°. The residue so obtained is dissolved in 300 ml. of anhydrous toluene and heated at steam bath temperature until the evolution of nitrogen ceases. The mixture is then refluxed for 1 hour and evaporated in vacuo to a residue consisting essentially of 2-(3-thianaphthenyl)-cyclopropanoIisocyanate which is employed in the next step without further purification.

This material is dissolved in 400 ml. of benzene to which has been added 40 ml. of 50% aqueous potassium hydroxide solution and the mixture stirred at reflux temperature for 1 hour. It is then cooled and rendered acidic by the addition of dilute hydrochloric acid and a small amount of #30 alcohol is next added to dissolve the solid material. The layers are separated and the organic solution extracted with dilute hydrochloric acid, these acidic extracts being combined with the aqueous layer. The combined acidic solutions are washed with ether and then rendered basic by the addition of 40% aqueous sodium hydroxide solution. The alkaline solution is next extracted with ether and the ether extracts in turn washed with water, dried over magnesium sulfate and evaporated in vacuo at a temperature less than 70° C. This residue is dissolved in 30% alcohol, filtered, acidified by the addition of ethereal hydrogen chloride and diluted with additional ether. The solid thus formed is collected by filtration to yield 2-(3-thianaphthenyl)-cyclopropylamine hydrochloride.

Treatment of an aqueous solution of this amine hydrochloride with base then yields the free amine which is collected by extraction with ether and evaporation of the ethereal extracts to a residue which consists of 2-(3-thianaphthenyl)-cyclopropylamine.

Example 29

An equivalent amount of 5-chlorothianaphthene is employed in the procedure of Example 28 and upon execution of the steps therein described, there is obtained the compound 2-(5-chloro-3-thianaphthenyl)-cyclopropylamine.

In a similar fashion by employing 4-chlorothianaphthene, 6-chlorothianaphthene, 7-chlorothianaphthene, 4-bromothianaphthene, 5-bromothianaphthene, 6-bromothianaphthene, and 7-bromothianaphthene, there are respectively obtained the compounds 2-(4-chloro-3-thianaphthenyl)-cyclopropylamine, 2-(6-chloro-3-thianaphthenyl)-cyclopropylamine, 2-(7-chloro-3-thianaphthenyl)-cyclopropylamine, 2-(4-bromo-3-thianaphthenyl)-cyclopropylamine, 2-(5-bromo-3-thianaphthenyl)-cyclopropylamine, 2-(6-bromo-3-thianaphthenyl)-cyclopropylamine, and 2-(7-bromo-3-thianaphthenyl)-cyclopropylamine.

Example 30

5-methylthianaphthene is substituted for thianaphthene in the procedure of Example 28 and upon execution of steps therein described, there is obtained the compound 2-(5-methyl-3-thianaphthenyl)-cyclopropylamine.

In a similar fashion by substituting 4-methylthianaphthene, 6-methylthianaphthene, 7-methylthianaphthene, 5-ethylthianaphthene, and 5-butylthianaphthene, there are respectively obtained the following compounds: 2-(4-methyl-3-thianaphthenyl)-cyclopropylamine, 2-(6-methyl-3-thianaphthenyl)-cyclopropylamine, 2-(7-methyl-3-thianaphthenyl)-cyclopropylamine, 2-(5-ethyl-3-thianaphthenyl)-cyclopropylamine and 2-(5-butyl-3-thianaphthenyl)-cyclopropylamine.

Example 31

5-methoxythianaphthenyl is employed in the place of thianaphthene in the procedure of Example 28 and there are thus obtained upon completion of the steps therein recited, 2-(5-methoxy-3-thianaphthenyl)-cyclopropylamine.

In a similar fashion by employing 6-methoxythianaphthenyl, 7-methoxythianaphthenyl, and 6-butoxythianaphthenyl, there are respectively obtained the compounds 2-(6-methoxy-3-thianaphthenyl)-cyclopropylamine, 2-(7-methoxy-3-thianaphthenyl)-cyclopropylamine, and 2-(6-butoxy-3-thianaphthenyl)-cyclopropylamine.

Example 32

5-nitrothianaphthene is subjected to the procedure of Example 28 and there is thus obtained upon completion of the steps therein described, 2-(5-nitro-3-thianaphthenyl)-cyclopropylamine.

Reduction of this compound according to the procedure of Example 5B then yields 2-(5-amino-3-thianaphthenyl)-cyclopropylamine.

Example 33

Five grams of 2-(2-thianaphthenyl)-cyclopropylamine are dissolved in ethyl acetate and treated with an equivalent amount of maleic acid. The solution is allowed to stand for several hours, then cooled and the solid so formed collected by filtration to yield 2-(2-thianaphthenyl)-cyclopropylamine maleate.

In a similar fashion by employing citric acid, mandelate acid, glacial acetic acid, tartaric acid and the like, there is prepared the corresponding acid addition salts.

Example 34

A solution of 24 g. of 2-(5-trifluoromethyl-2-thianaphthenyl)-cyclopropylamine in 100 ml. of ethylformate is refluxed for 17 hours. The excess ethylformate is evaporated in vacuo to yield a residue comprising of N-formyl 2(5-trifluoromethyl-2-thianaphthenyl)-cyclopropylamine.

To a stirred solution of 28 g. of N-formyl 2-(5-trifluoro-2-thianaphthenyl)-cyclopropylamine in 150 ml. of diethylene glycol dimethyl ether is added 5.2 g. of 54.5% suspension of sodium hydroxide in mineral oil. The mixture is refluxed for 2 hours, cooled and an additional 5.2 g. of the sodium hydroxide dispersion is added. The mixture is refluxed for an additional 2 hours, cooled and 67 ml. of methyl iodide are added. After standing for 16 hours at room temperature, the mixture is refluxed for 8 hours employing an acetone-Dry Ice condenser. At the end of this time the mixture is allowed to stand for 72 hours at room temperature after which period 20 ml. of methyl iodide are added and the mixture again refluxed for 4 hours employing an acetone-Dry Ice condenser. Filtration of the mixture and concentration in vacuo of the filtrate to approximately 70 ml. then yields a residual liquid which when poured into 1 l. of ice water precipitates as an oil. The oil is extracted with methylene chloride, the extracts dried over magnesium sulfate and the solvents removed in vacuo. Distillation of the residual oil then yields N-methyl-N-formyl 2-(5-trifluoromethyl-2-thianaphthenyl)-cyclopropylamine.

A mixture of 15 g. of N-methyl-N-formyl 2-(5-trifluoromethyl-2-thianaphthenyl)-cyclopropylamine and 100 ml. of 37% hydrochloric acid is refluxed with stirring for 20 hours. The mixture is then extracted with ether and the aqueous portion concentrated in vacuo. A solution of the resultant crystalline residue in 200 ml. of water is extracted with ether, and the aqueous fraction rendered strongly alkaline by the addition of 40% aqueous sodium hydroxide solution. This alkaline solution is then extracted with ether, the ether extracts dried over magnesium sulfate and the solvents removed in vacuo to yield 2-(5-trifluoromethyl-2-thianaphthenyl)-cyclopropylmethylamine.

*Example 35*

A 40% aqueous solution of formaldehyde (5.1 g.) is added to a cooled solution of 4.3 g. of 2-(6-chloro-3-thianaphthenyl)-cyclopropylamine in 6.6 g. of 90% formic acid. The mixture is then refluxed for 18 hours after which time the cooled reaction mixture is treated with 2.7 ml. of concentrated hydrochloric acid. Evaporation of the solution to a residue and treatment of this residue with 50% potassium hydroxide solution followed by extractions with ether yields an ethereal solution of 2 - (6 - chloro - 3 - thianaphthenyl) - cyclopropyldimethylamine which is isolated by drying the ethereal solution and evaporating same to a residue.

An ethereal solution of the free base is treated with ethereal hydrogen chloride to yield the corresponding hydrochloride salt.

*Example 36*

A mixture of 19 g. of 2-(5-methoxy-3-thianaphthenyl)-cyclopropylamine, 22.9 g. of 1,5-dibromopentane and 30.0 g. of potassium carbonate in 200 ml. of xylene is refluxed for 14 hours. The cooled reaction mixture is treated with water, the xylene layer separated and evaporated to a residue which comprises 1-piperadinyl-2-(5-methoxy-3-thianaphthenyl)-cyclopropane.

*Example 37*

Five grams of 2-(2-thianaphthenyl)-cyclopropylamine, 4.9 g. of methyl bis-(β-chloroethyl)-amine and 8.9% potassium carbonate in 50 ml. of xylene are combined and heated at reflux temperature for 15 hours. The mixture is then cooled, 50 ml. of water are added, the layers separated and the organic layer evaporated to a residue which upon recrystallization from ether yields 1-(N-methylpiperazinyl)-2-(2-thianaphthenyl)-cyclopropane.

*Example 38*

1,4-dibromobutane (5.4 g.) is substituted for methyl bis-(β-chloroethyl)-amine in the procedure of Example 37 and there is thus obtained the compound, 1-pyrrolidinyl-2-(2-thianaphthenyl)-cyclopropane.

We claim:

1. Compounds selected from the group consisting of bases having the structural formula:

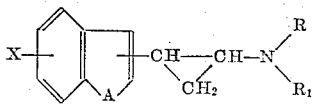

wherein X is a member selected from the group consisting of hydrogen, halogeno, lower alkyl, lower alkoxy, nitro, trifluoromethyl, amino, and hydroxy; A is a member selected from the group consisting of —O—, —S—, and

and R and R₁ are members selected from the group consisting of hydrogen, lower alkyl, and taken together with the nitrogen atom to which R and R₁ are attached, piperidinyl, pyrrolidinyl, piperazinyl, N-methylpiperazinyl, and N-hydroxyethylpiperazinyl; and the non-toxic pharmaceutically acceptable acid addition salts thereof.

2. Compounds having the formula:

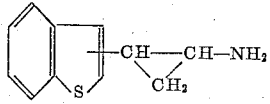

3. Compounds having the formula:

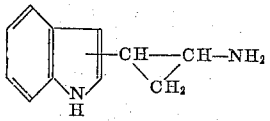

4. Compounds having the formula:

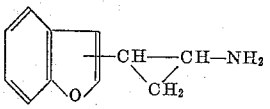

5. 2-(2-thianaphthenyl)-cyclopropylamine.
6. 2-(3-thianaphthenyl)-cyclopropylamine.
7. 2-(2-benzofuryl)-cyclopropylamine.
8. 2-(3-benzofuryl)-cyclopropylamine.
9. 2-(2-indolyl)-cyclopropylamine.
10. 2-(3-indolyl)-cyclopropylamine.

11. In the process for the preparation of compounds having the formula:

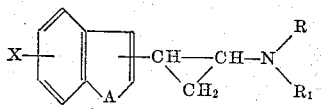

wherein X is a member selected from the group consisting of hydrogen, halogeno, lower alkyl, lower alkoxy, nitro, trifluoromethyl, amino, and hydroxyl; A is a member selected from the group consisting of —O—, —S—, and

and R and R₁ are members selected from the group consisting of hydrogen, lower alkyl, and taken together with the nitrogen atom to which R and R₁ are attached, a 5 to 6 membered heterocyclic ring; the steps comprising converting a 2-substituted cyclopropanecarboxylic acid having the formula:

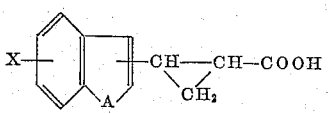

to the corresponding acid chloride by treatment with thionyl chloride, treating said acid chloride with an aqueous solution of sodium azide thereby forming the corresponding cyclopropanecarboxyazide, subjecting said cyclopropanecarboxyazide to low temperature pyrolysis thereby forming the corresponding cyclopropanolisocyanate, and treating said cyclopropanolisocyanate with aqueous alkali so as to effect basic hydrolysis and thereby form the correspondingly 2-substituted cyclopropylamine.

No references cited.